United States Patent [19]

Keiter et al.

[11] Patent Number: 5,129,857
[45] Date of Patent: Jul. 14, 1992

[54] METHOD AND APPARATUS FOR ORIENTING LIVE POULTRY

[76] Inventors: Marlin E. Keiter, 10812 Cathell Rd., Berlin, Md. 31811; Charles E. Lewis, Box 9905 Elm St., Ocean City, Md. 21842

[21] Appl. No.: 784,318

[22] Filed: Oct. 29, 1991

[51] Int. Cl.⁵ .................................................. A23C 7/02
[52] U.S. Cl. ...................................... 452/179; 452/53; 119/82
[58] Field of Search ............... 452/179, 53, 54, 55; 119/82, 155

[56] References Cited

U.S. PATENT DOCUMENTS

| | | | |
|---|---|---|---|
| 4,215,654 | 8/1980 | Parker, Jr. | 452/183 |
| 4,301,770 | 11/1981 | Parker, Jr. | 119/82 |
| 4,736,710 | 4/1988 | Nicolai | 119/82 |

*Primary Examiner*—Bruce M. Kisliuk
*Assistant Examiner*—Lawrence Cruz
*Attorney, Agent, or Firm*—Shoemaker and Mattare, Ltd.

[57] ABSTRACT

When birds are placed upright on the interior surface of an open-ended, non-vertical rotating drum, the birds turn, regardless of their initial orientation, so as to face "uphill" in the drum. The birds leaving the drum are all found to have the same orientation, and thus can be more easily hung on shackles.

An apparatus for performing the method comprises a frame, bearings connected to the frame, an open-ended drum supported for rotation about its longitudinal axis by the bearings, means for rotating the drum about its axis, means for depositing a series of birds on the interior surface of the drum, at a first end of the drum as it rotates, and means for receiving birds exiting from a second end of the drum. The drum preferably declines from the first end toward the second at a depression angle of about 15°.

17 Claims, 2 Drawing Sheets

METHOD AND APPARATUS FOR ORIENTING LIVE POULTRY

BACKGROUND OF THE INVENTION

1. Field of the Invention

This invention relates to slaughtering, and more particularly to the task of orienting live poultry in preparation for automated slaughtering and butchering.

2. Description of the Prior Art

The processing (slaughtering and butchering) of chickens is today becoming highly mechanized. Many automated processes are performed while a chicken is suspended, by its feet or legs, from a shackle conveyor which carries the bird through various stations. While some process steps can be done completely by machine, or with only incidental human intervention or supervision, other steps are still done by hand. One such step is the initial step of loading live birds into a shackle conveyor. This is an unpleasant task, during which the handlers are exposed to dust, feathers, fecal matter and so forth. The birds, in addition, are frequently damaged by impatient handlers, which may result in a product with bruised meat, or broken bones.

For these reasons, there is interest in automating the loading of live birds into a shackle conveyor. The difficulties can be imagined. Although chickens are not the most intelligent creatures, they are smart enough to resist the capturing process, and would certainly not be expected to assist it. We have found, however, that we can cause chickens, situated at random orientations on a surface, to orient themselves in a common direction. Once chickens are aligned the same way, the automating of the hanging process will be a simpler matter. This invention is directed only to the orienting step; it is expected that this invention will enable others to automate the hanging step.

Various attempts have been made by others to orient chickens, for example, by blowing a gas at a chicken from a particular direction, or by passing the chicken over a series of non-aligned conveyor intersections. None of these methods has proven workable, and many such proposals are expensive and complicated, certainly more so than the invention described below.

SUMMARY OF THE INVENTION

An object of this invention is to cause a chicken to align itself in a predetermined direction with respect to a conveyor, and without contacting the body of the bird.

Another object of the invention is to reduce the need for people to handle chickens, and thus to reduce their exposure to dust, fecal matter, and so on. A related object is to reduce the incidence of injury to birds during the process of loading a shackle conveyor.

These an other objects of the invention are achieved by placing each of a series of birds upright on the interior surface of an open-ended, non-vertical rotating drum. We have found that the birds will turn, regardless of their initial orientation, so as to face "uphill" in the drum. The birds leaving the drum are all found to have the same orientation, and thus can be more easily hung on shackles, possibly automatically.

The invention also includes an apparatus for performing the method, comprising a frame, bearings connected to the frame, an open-ended drum supported for rotation about its longitudinal axis by the bearings, means for rotating the drum about its axis, means for depositing a series of birds on the interior surface of the drum, at a first end of the drum as it rotates, and means for receiving birds exiting from a second end of the drum. The drum preferably declines from the first end toward the second at a depression angle of about 15°.

BRIEF DESCRIPTION OF THE DRAWINGS

In the accompanying drawings.

DESCRIPTION OF THE PREFERRED EMBODIMENT

Figure 1:
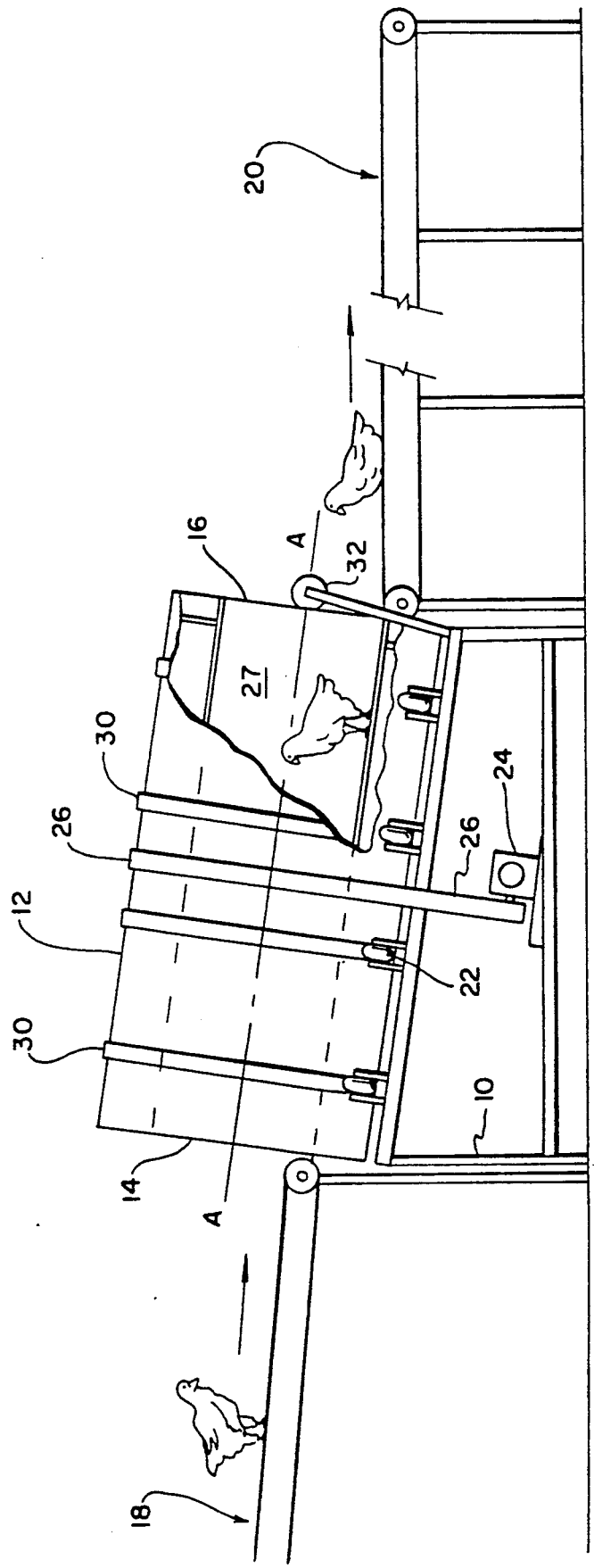
FIG. 1 is a side elevation of an apparatus embodying the invention.
Figure 2:
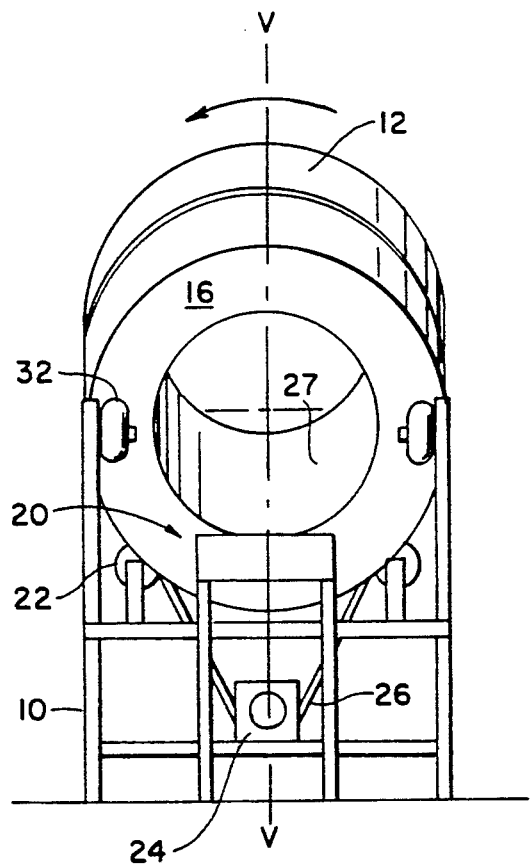
FIG. 2 is an end view thereof.
Figure 3:
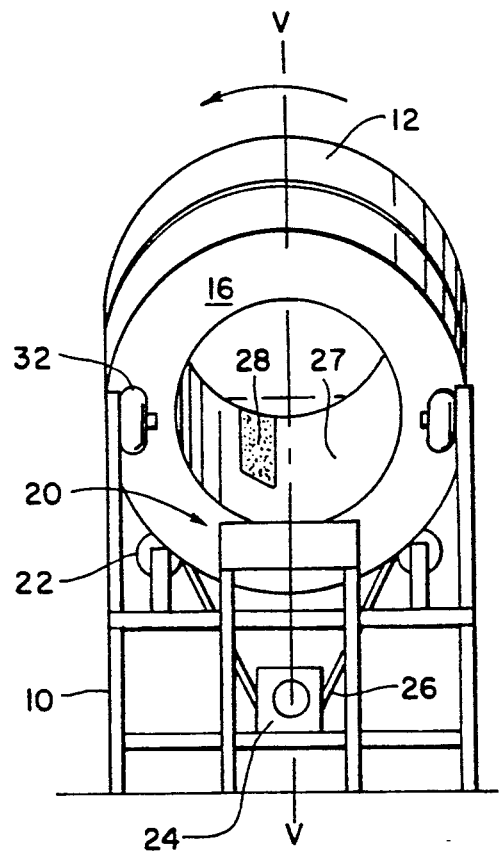
FIG. 3 is a view similar to FIG. 2, showing a modified form of the invention.

An apparatus embodying the invention, as shown in FIGS. 1-3, comprises a frame 10 supporting a rotatable drum 12, open at both ends 14, 16. The longitudinal axis "A—A" of the drum declines from its inlet end to its outlet end an angle of about 10°-15° from horizontal. Conventional belt conveyors 18, 20 are provided at either of the drum, for feeding a series of birds into the drum, and then transferring them to a location at which they are suspended from shackles. The upper surface of the inlet conveyor 18 is about twenty-four inches wide, and terminates at a level about four inches above the interior surface of the drum at its upstream end. The outlet conveyor, about eighteen inches wide, is substantially horizontal, and level with the interior drum surface.

The ends and interior of the drum must be unobstructed; therefore, we prefer to support the drum on an array of external rollers 22 (four pairs of rollers being shown in the drawings, which depict the best mode presently contemplated of carrying out the invention), each of which is supported by a respective bearing on the frame 10. The drum is rotated by a frame-mounted motor 24, via a drive belt 26 as shown. Alternatively, another endless member like a chain could be used, or one or more of the rollers could be directly driven by a motor.

The preferred drum is double-walled, as shown, but a simple single-walled drum could be used as well. The drum may be constructed of metal, plastic, or any suitable material. Stainless steel is presently preferred. We have found that good results are obtained when the interior surface 27 of the drum has a smooth surface finish (that is, a surface that is smooth to the touch and free of visible grooves or irregularities), and this is presently preferred. However, it may be found advantageous in some circumstances to roughen a portion of the interior surface 27, to cause the birds to "stumble", thus actively provoking them into changing their orientation. For example, a strip of emery paper 28 can be adhered to the interior surface, running parallel to the drum axis. This variation is shown in FIG. 3.

The drawings depict four bands 30, each extending around the outer circumference of the drum. The bands serve as radial bearing surfaces, which ride on the respective rollers 22 to keep the drum from moving longitudinally with respect to the rollers. The bands have the additional function of stiffening the drum, so that the remainder of the drum can be made of a light gauge metal, or even plastic. The drum is prevented from moving axially, by a pair of thrust wheels 32, one of which appears in FIG. 1, bearing against the drum's outlet end 16.

In operation, the drum is continuously rotated in one direction at a constant speed; the inlet and outlet conveyors also operate continuously. Upstream of the drum, a series of birds are placed upright (manually or by machine) on the inlet conveyor, at random orientations. They are discouraged from flying off the conveyor by any of various means, such as a physical covering, or a darkened environment.

The inlet conveyor deposits each bird, upright, on the interior surface of the drum. The bird remains on its feet while the drum carries it in the direction of rotation to the angle of repose, that is, to the point where gravity overcomes friction, and the bird's feet start to slide along the surface of the drum.

This is the critical point of the process. We have found that the birds, when they start sliding on the drum surface, will almost invariably turn so that they are pointing "uphill", away from the vertical center plane "V—V" (FIG. 2) of the drum. Practically every bird turns to face the same way as it slides through the drum toward the lower end, an onto the outlet conveyor. Thus, the birds, properly stimulated by the apparatus, readjust their own positions in a uniform manner, and exit the drum facing the same way.

The outlet conveyor should be maintained in darkness, to keep the birds—now facing in one direction—from changing position as they approach the shackle conveyor. The birds may now be easily loaded into the shackles.

Inasmuch as the invention is subject to modifications and variations, it is intended that the foregoing description and the accompanying drawings shall be interpreted as illustrative of only one form of the invention defined by the following claims.

We claim:

1. A method of orienting a live bird in a predetermined direction, comprising placing the bird upright on the interior surface of an open-ended, non-vertical rotating drum.

2. A method of causing a live animal to face in a predetermined direction, comprising placing the animal upright on the interior surface of an open-ended, non-vertical rotating drum.

3. A method of causing a series of live birds at random orientations to face in a common direction, comprising introducing the birds, upright, in sequence onto the interior surface of an open-ended drum having a non-vertical longitudinal axis while rotating the drum about said axis in one direction, and thereafter depositing the birds on an outlet conveyor surface.

4. The method of claim 3, wherein the drum has an axis of rotation, and that axis is inclined with respect to the horizontal at not more than 45°.

5. The method of claim 3, wherein the drum has an axis of rotation, and that axis is inclined with respect to the horizontal at an angle in the range of 10° to 15°.

6. The method of claim 3, wherein the drum has an axis of rotation, and that axis is inclined with respect to the horizontal at an angle of about 15°.

7. The invention of claim 3, wherein the interior surface of the drum is substantially smooth and continuous.

8. The invention of claim 3, wherein the placing step comprises a step of transferring the bird from an inlet conveyor onto the interior surface of the drum.

9. The invention of claim 3, further comprising a step of removing the bird from the drum onto an outlet conveyor, without changing its orientation.

10. An apparatus for orienting a live bird in a predetermined direction, comprising
a frame,
bearing means connected to the frame,
an open-ended drum supported for rotation about its longitudinal axis by said bearing means, said drum having an inlet end and an outlet end,
means for rotating the drum about said axis,
means for depositing a series of birds on the interior surface of the drum, at said inlet end of the drum as it rotates, and
means for receiving birds exiting from said outlet end of the drum.

11. The invention of claim 10, wherein the drum axis is inclined with respect to the horizontal, so that the outlet end of the drum is lower than the inlet.

12. The invention of claim 11, wherein the angle of inclination is less than 45°.

13. The invention of claim 11, wherein the angle of inclination is in the range of 10° to 15°.

14. The invention of claim 11, wherein the angle of inclination is about 15°.

15. The invention of claim 10, wherein said interior surface is substantially smooth and continuous.

16. The invention of claim 10, wherein a portion of said interior drum surface is roughened more than the remainder of the surface, to provoke the bird into moving.

17. The invention of claim 10, further comprising an array of rollers contacting the exterior surface of the drum, for supporting the drum for rotation, and wherein the means for rotating the drum comprises an endless belt passing around the drum and in contact therewith, and a motor for driving the belt.

* * * * *